(12) United States Patent
Ren et al.

(10) Patent No.: US 10,607,070 B2
(45) Date of Patent: Mar. 31, 2020

(54) HUMAN SEARCH AND IDENTIFICATION IN COMPLEX SCENARIOS

(71) Applicant: Intel Corporation, Santa Clara, CA (US)

(72) Inventors: Haibing Ren, Beijing (CN); Fei Duan, Beijing (CN); Yimin Zhang, Beijing (CN); Xiaobo Hu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/562,070

(22) PCT Filed: Sep. 30, 2016

(86) PCT No.: PCT/CN2016/101152
§ 371 (c)(1),
(2) Date: Sep. 27, 2017

(87) PCT Pub. No.: WO2018/058557
PCT Pub. Date: Apr. 5, 2018

(65) Prior Publication Data
US 2018/0247117 A1  Aug. 30, 2018

(51) Int. Cl.
*G06K 9/00* (2006.01)
*G05D 1/02* (2020.01)
(Continued)

(52) U.S. Cl.
CPC ............ *G06K 9/00369* (2013.01); *B25J 9/00* (2013.01); *G05D 1/0246* (2013.01);
(Continued)

(58) Field of Classification Search
CPC .... G06K 9/003; G06K 9/002; G06K 9/00664; G06K 9/00671; G06K 9/00899;
(Continued)

(56) References Cited

U.S. PATENT DOCUMENTS

| 9,355,305 | B2* | 5/2016 | Tanabiki | G06T 7/75 |
| 2013/0035790 | A1 | 2/2013 | Olivier, III et al. | |
| 2013/0136300 | A1* | 5/2013 | Wagner | G06T 7/74 382/103 |
| 2013/0250050 | A1* | 9/2013 | Kanaujia | H04N 7/181 348/42 |
| 2014/0072170 | A1* | 3/2014 | Zhang | G06K 9/00369 382/103 |
| 2015/0269427 | A1* | 9/2015 | Kim | G06K 9/00369 348/159 |

(Continued)

FOREIGN PATENT DOCUMENTS

| CN | 102411368 A | 4/2012 |
| CN | 103116840 A | 5/2013 |

(Continued)

OTHER PUBLICATIONS

International Search Report and Written Opinion for International Patent Application No. PCT/CN2016/101152, dated Jun. 30, 2017, 11 pages.

(Continued)

*Primary Examiner* — Tsung Yin Tsai
*Assistant Examiner* — Stephen M Brinich
(74) *Attorney, Agent, or Firm* — Jordan IP Law, LLC

(57) ABSTRACT

Systems, apparatuses and methods may generate a map of a search environment based on a probability of a target human being present within the search environment, capture a red, green, blue, depth (RGBD) image of one or more potential target humans in the search environment based on the map, and cause a robot apparatus to obtain a frontal view position with respect to at least one of the one or more potential target humans based on the RGBD images.

20 Claims, 4 Drawing Sheets

(51) Int. Cl.
*B25J 9/00* (2006.01)
*G06T 7/70* (2017.01)
*G06T 7/55* (2017.01)

(52) U.S. Cl.
CPC ....... *G05D 1/0274* (2013.01); *G06K 9/00228* (2013.01); *G06K 9/00288* (2013.01); *G06K 9/00664* (2013.01); *G06K 9/00899* (2013.01); *G06T 7/55* (2017.01); *G06T 7/70* (2017.01); *G05D 2201/0211* (2013.01)

(58) Field of Classification Search
CPC ........... G06K 9/00885; G06K 9/00892; G06K 9/00912; G06K 9/00919; G06T 7/55; G06T 7/50; G05D 1/0246; G05D 1/0248; G05D 1/0251; G05D 1/0274; B25J 9/00; B25J 9/0003
USPC ................... 382/103–10, 100, 165, 170, 181
See application file for complete search history.

(56) References Cited

U.S. PATENT DOCUMENTS

2015/0310263 A1* 10/2015 Zhang ................ G06K 9/00315
382/103
2016/0188977 A1* 6/2016 Kearns ............... G06K 9/00664
348/113

FOREIGN PATENT DOCUMENTS

| CN | 104834309 A | 8/2015 |
| CN | 105182983 A | 12/2015 |

OTHER PUBLICATIONS

Michael Volkhardt et al., "Finding People in Home Environment with a Mobile Robot", Proceedings of 6th European Conference on Mobile Robots, 2013, 6 pages, Barcelona Spain.

* cited by examiner

HUMAN SEARCH AND IDENTIFICATION IN COMPLEX SCENARIOS

CROSS REFERENCE TO RELATED APPLICATIONS

This application is a U.S. National Phase Patent Application which claims benefit to International Patent Application No. PCT/CN2016/101152 filed on Sep. 30, 2016.

TECHNICAL FIELD

Embodiments generally relate to human searching and identification. More particularly, embodiments relate to robotic human searching and identification.

BACKGROUND

Mobile robots may provide useful services to humans including personal assistance, surveillance, and object delivery. Mobile robots may encounter complex scenarios when targeting a particular human. For example, a target human may be located in a room with other individuals and may not be in full view of the robot. Moreover, a target human may assume many positions and may not be facing the robot. Current solutions may require potential target humans to interact with a robot searching for someone other than themselves, which may lead to an unsatisfying user experience.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
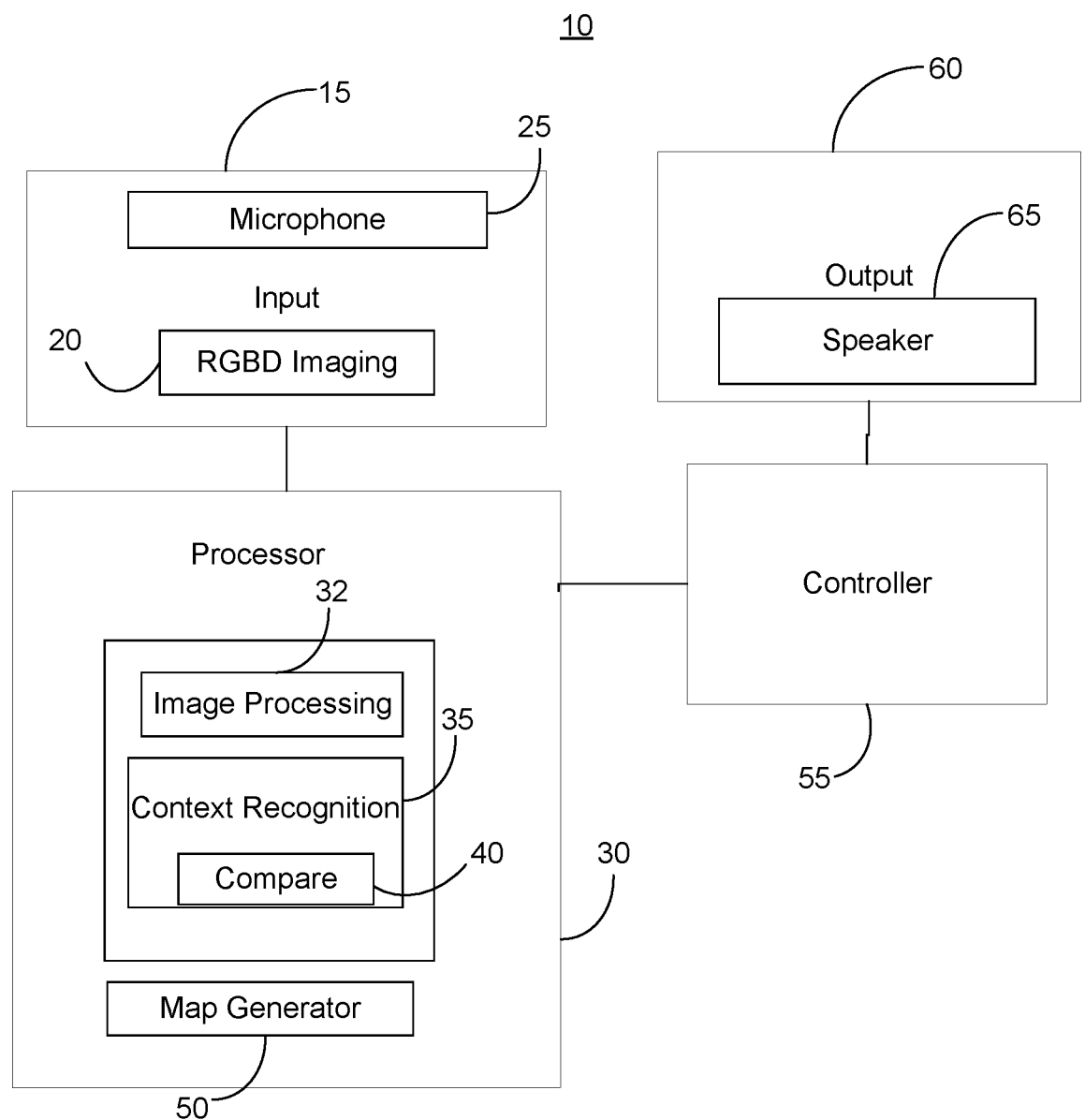
FIG. 1 is a block diagram of an example of a human search apparatus according to an embodiment.

Turning now to FIG. 1, a human search apparatus 10 is shown. In some embodiments, the apparatus 10 may be used with a mobile robot that may be tasked with locating a particular human in complex scenarios that may involve multiple locations and multiple people (e.g., a crowded room). The apparatus 10 may include logic instructions, configurable logic, fixed-functionality hardware logic, etc., or any combination thereof. In the illustrated example, an input 15 includes an RGBD (red, green, blue, depth) imaging device 20. The RGBD imaging device 20 may be a depth imaging device that provides both color (red, green, blue/RGB) pixels and depth (D) pixels. The use of depth information may provide additional discriminative features and may permit ignoring complex backgrounds that could otherwise degrade performance. The input 15 may further include a microphone 25; oral instructions may be received through the microphone 25. For example, if a user gives a robot an object to be taken to a target human, the user may instruct the robot to find that particular human and give that person the object. The microphone 25 may also be used to listen for sounds emitted by potential target humans that may be used in connection with a map to search for a target human, to be discussed in further detail below.

The input 15 may communicate with a processor 30 that includes an image processing portion 32, context recognition portion 35, and a comparison portion 40. The image processing portion 32 may receive an RGBD image from the input 15 and detect/track a human region in the image, in part using the context recognition portion 35. Context information may be related to characteristics of a potential target human including height, shape, hair, clothing, ethnicity, etc. The comparison portion 40 may be provided within the context recognition portion 45 to compare a confidence value of a potential target human image to a threshold value, to be described in greater detail below.

To assist a robot apparatus with performing a search, the processor 30 may include a map generator 50 to build a map of the environment to be searched and to generate a human map indicating where potential target humans may be located. When generating the human map, the map generator 50 may take into account various factors such as the time of day and what a potential target human may be doing at that time of day. For example, if it is a meal time, the human map may indicate a higher probability that a potential target human is located in the dining area of an apartment. Likewise, if it is late at night, the human map may indicate a higher probability that the potential target human is located in a bedroom. Further, in connection with the microphone 25, if sounds are detected coming from a particular room, the map may be updated to indicate a higher probability of humans in that particular room.

In connection with the processor 30, a controller 55 may be instructed to move a robot apparatus to conduct a search of the environment when seeking a potential target human. As will be discussed further below, the controller 55 may cooperate with the image processing portion 32 to navigate to a frontal view of the potential target human to perform facial imaging. When insufficient room prevents a robot from navigating to a frontal view, the controller 55 may interact with an output 60 through a speaker 65 to address a potential target in order to conduct three-dimensional facial imaging.

Figure 2:
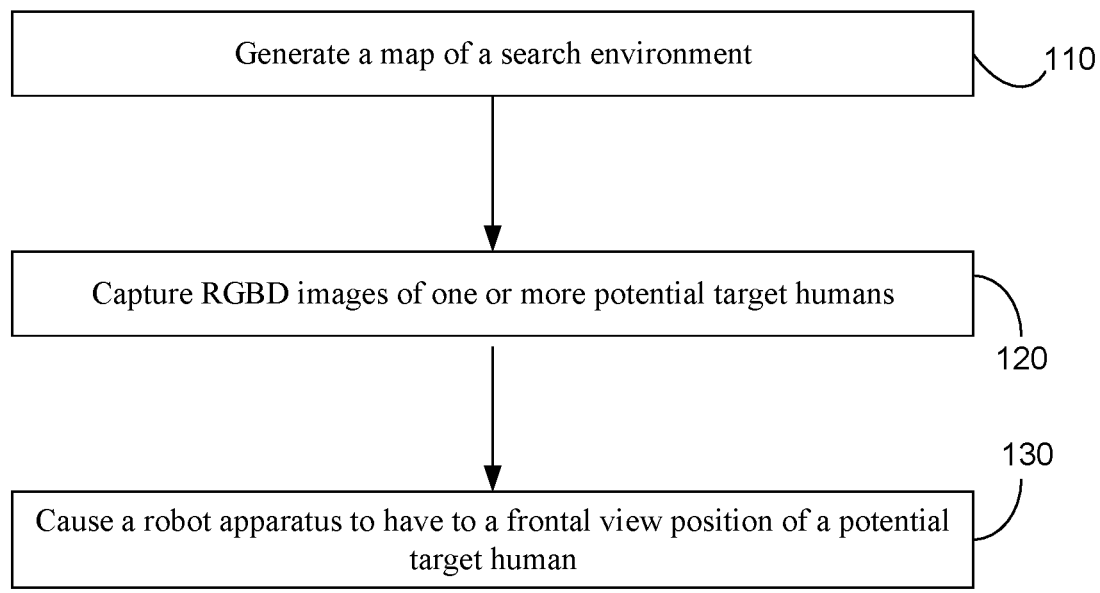
FIG. 2 is a flowchart of an overview example of a method to target humans.

FIG. 2 shows an overview method 100 of operating the apparatus of FIG. 1. More particularly, the method 100 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 100 may be written in any combination of one or more programming languages, including an object oriented programming language such as JAVA, SMALLTALK, C++ or the like and conventional procedural programming languages, such as the "C" programming language or similar programming languages.

Illustrated processing block 110 may provide for generating a map of a search environment in which to conduct a search for a potential target human. In generating the map, block 110 may communicate with a network through wired or wireless means to obtain information such as floor plans, furniture arrangements, access points, etc. In addition to or alternative to information communicated from a network, block 110 may consult one or more memory devices to obtain mapping information. To generate the human map, block 110 may consider the time of day, the personal characteristics of the potential target human (e.g., which bedroom is used by the target), potentially learned traits of the potential target human from previous interactions, and sounds of human voices coming from various locations.

In illustrated processing block 120, a robot searches, according to the maps, for the potential target human. As part of this search, block 120 may use an RGBD imager such as, for example, the RGBD imager 20 (FIG. 1) to capture images of one or more potential target humans. As will be discussed in greater detail below, block 120 determines if captured images are of humans and then, if humans, whether an image may represent the potential target human.

Turning to illustrated processing block 130, if a captured image represents a potential target human, block 130 will direct a robot to move to a frontal position of the potential target human in order to conduct facial imaging. Alternatively, when insufficient clearance prevents robot movement, block 130 may cause the robot to interact with a potential target human through, for example, the speaker 65 (FIG. 1) of the output 60 (FIG. 1).

Figure 3:
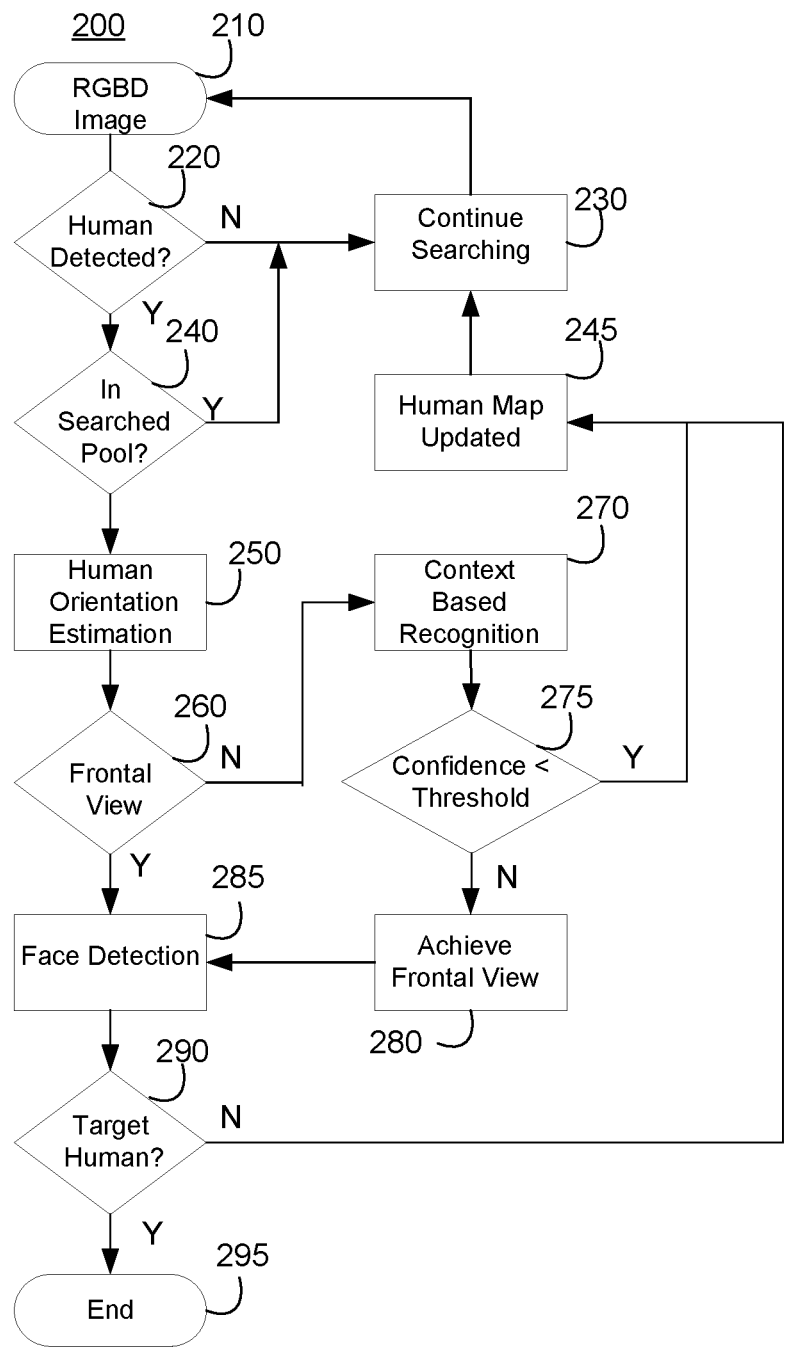
FIG. 3 is a flowchart of an example of a method to target humans.

FIG. 3 shows a method 200 of identifying target humans. The method 200 may generally be implemented in the apparatus 10 of FIG. 1, already discussed. More particularly, the method 200 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. Unless specifically stated otherwise, it may be appreciated that terms such as "processing," "computing," "calculating," "determining" or the like refer to the action and/or process of a computer or computing system, or similar electronic computing device, that manipulates and/or transforms data represented as physical quantities (for example, electronic) within registers and/or memory units of the computer into other data similarly represented as physical quantities with the registers, memory units, or other such information storage transmission or displays of the computer system. The embodiments are not limited in this context.

Illustrated processing block 210 performs imaging of an environment, using the RGBD imager 20 of FIG. 1. In illustrated processing block 220, the image processing portion 32 (FIG. 1) determines whether an image of a human has been captured. If no human images are captured, the human map will be updated and a new searching path may be generated in processing block 230. For example, if a robot is in the kitchen and finds no humans present, the search path may direct the robot to proceed to the dining room to continue searching for the target human. If humans are detected through the imaging, the method proceeds to processing block 240. In processing block 240, the image processing portion 32 (FIG. 1) determines whether the images detected are of humans already searched in the search pool; that is, humans who have been determined not to be the target humans. If so, a search is continued in processing block 230. If the human image detected is not in the searched pool, human orientation is estimated in illustrated processing block 250. Human orientation may be classified as, for example, frontal, near-frontal, left, right, back, and so forth. The orientation category may be estimated based on application of a random forest classifier with leaf node template matching, to the detected image, wherein the orientation category defines a range of angular offsets relative to an angle corresponding to the potential target human being imaged. An example of a method of estimating human orientation is described in copending PCT/CN2016/084512 filed 2 Jun. 2016. Based on the orientation category, processing block 260 determines whether the image is a frontal view. If the image is not a frontal view, context-based recognition may be used to determine whether the image is of a potential target human at processing block 270. Context includes features such as height, estimated weight, shape, hair, ethnicity, clothing color and type, etc. A confidence value from the context-based recognition is determined and, in processing block 275 the generated confidence value is compared to a threshold value. If the confidence value is less than the threshold value, it is determined that the image is not of the target human and the human map is updated with this information at processing block 245. For this situation, searching by the robot may continue.

If the confidence value is greater than the threshold value, it is determined that the image may be a potential target human and the process proceeds to processing block 280 to determine if a frontal view is presented. Determining whether a view is a frontal view allows imaging of facial features. Based on an orientation estimation, the apparatus 10 (FIG. 1) instructs a robot to move around the potential target human while estimating the potential target human's orientation. This process is repeated until a frontal view is achieved. Alternatively, in the case of insufficient space, the robot is instructed to move towards the potential target human to address the potential target human via the speaker 65 (FIG. 1).

Once a frontal view is achieved, face detection and identification may proceed in processing block 285. Using the color and depth information of the image, facial landmarks may be processed to determine if the target human has been found. An example of a method of facial imaging is found in copending PCT/CN2016/082603 filed 19 May 2016. If facial detection determines that the image is the target human, the search ends in block 295. If it is determined that the image is not the target human, the human map is updated at block 245 and the search process may continue. The search process may continue until the target human is found or until the entire map has been searched.

Figure 4:
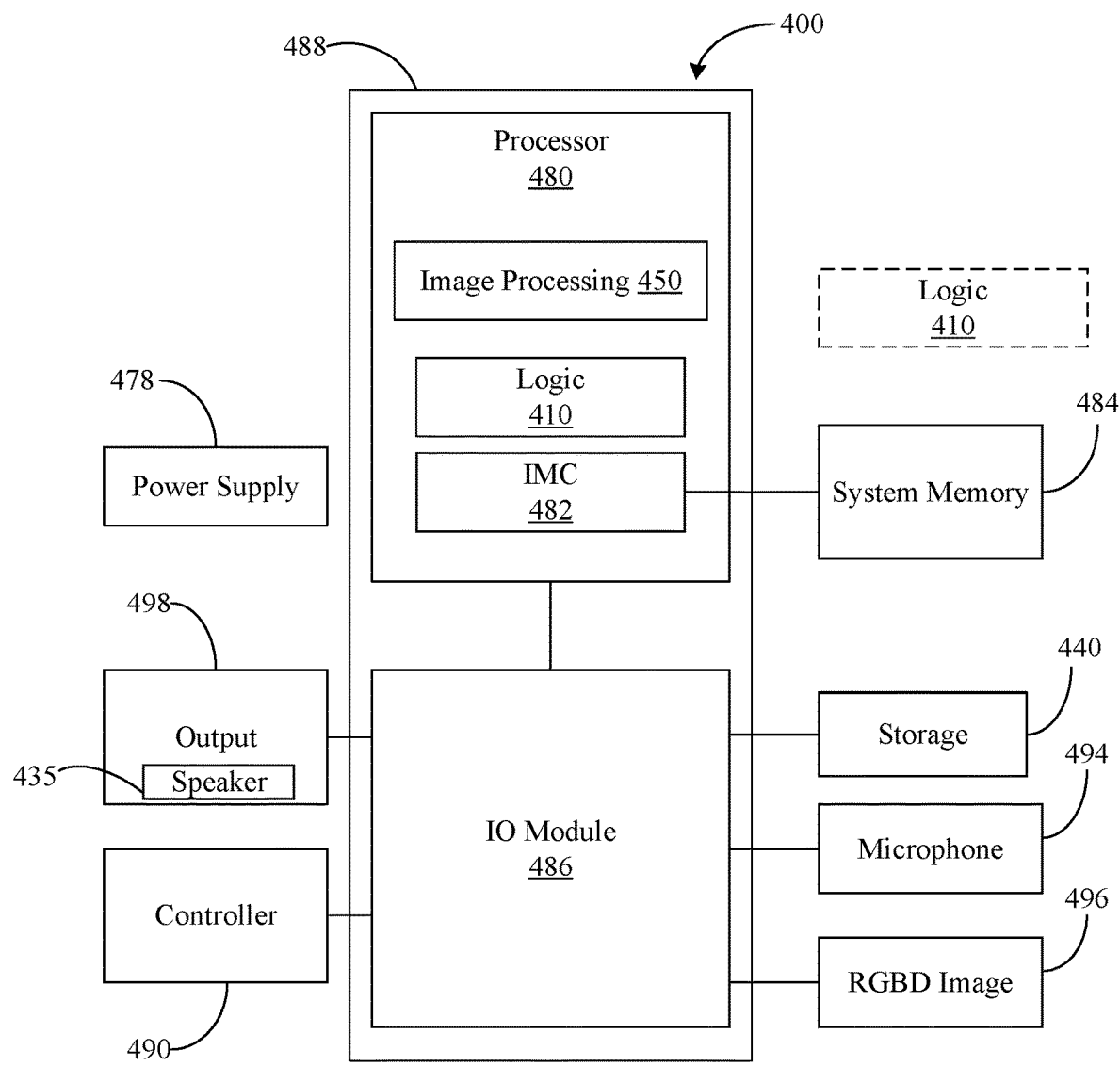
FIG. 4 is an example of a system according to an embodiment.

FIG. 4 shows an example human search system 400 that may be configured to identify target humans in complex scenarios. The system 400 may be incorporated into a computing device such as a tablet computer, smart phone, personal digital assistant (PDA), mobile Internet device (MID), portable computer, handheld computer, wearable device, etc., or any combination thereof. The system 400 may also be incorporated into a robot directly or by way of one of the computing devices set forth above. The illustrated system includes a power supply 478 to provide power to the system 400 and a processor 480 with an image processing portion 450 and an integrated memory controller (IMC) 482, which may communicate with system memory 484. Image processing may alternatively be performed in a graphics processing unit, not shown. The system memory 484 may include, for example, dynamic random access memory (DRAM) configured as one or more memory modules such as, for example, dual inline memory modules (DIMMs), small outline DIMMs (SODIMMs), etc.

The illustrated system 400 also includes an input output (IO) module 486 implemented together with the processor 480 on a semiconductor die 488 as a system on chip (SoC), wherein the IO module 486 functions as a host device and may communicate with, for example, a controller 490, RGBD imaging device 496, output 498, speaker 435, microphone 494, and mass storage 440 (e.g., optical disk, hard disk drive/HDD, flash memory, block storage, solid state disk/SSD, etc.). The processor 480 may include logic 410 (e.g., implemented in logic instructions, configurable logic, fixed-functionality logic hardware, etc., or any combination thereof) that may generate an environmental map and a human map, perform context recognition and comparing, and optionally perform image processing. Alternatively, portions of the logic 410 may be performed in a graphics processor, not shown. In one example, context recognition and threshold comparison is performed on an image obtained from RGBD image device 496. Thus, the logic 410 may implement one or more aspects of the method 100 (FIG. 2) and/or the method 200 (FIG. 3), already discussed.

ADDITIONAL NOTES AND EXAMPLES

Example 1 may include a human search apparatus comprising a map generator to generate a map of a search environment based on a probability of a target human being present within the search environment, an image sensor to capture a red, green, blue, depth (RGBD) image of one or more potential target humans in the search environment based on the map; and a controller to cause a robot apparatus to obtain a frontal view or near-frontal position with respect to at least one of the one or more potential target humans based on the RGBD images.

Example 2 may include the apparatus of example 1, further comprising an image processor to classify potential target human orientation.

Example 3 may include the apparatus of example 1, further comprising an input communicating with the controller, the input including the RGBD image sensor and including a microphone.

Example 4 may include the apparatus of example 1, further comprising an output communicating with the controller including a speaker.

Example 5 may include the apparatus of example 4, wherein the controller is configured to cause an audible communication to be emitted from the speaker to a potential target human when the image processor determines that there is insufficient room to move the robot apparatus in front of the potential target human, and wherein the audible communication prompts the potential target human to turn towards the robot apparatus to obtain the frontal or near-frontal view position.

Example 6 may include the apparatus of any of examples 1-4, further comprising a context recognition unit to determine whether a potential target human is an actual target human.

Example 7 may include the apparatus of example 6, further comprising a comparing unit to determine if a context-based recognition of the potential target human is higher or lower than a threshold value.

Example 8 may include the apparatus of example 7, wherein if the context-based recognition of the potential target human is lower than a threshold value, the robot apparatus moves to image another potential target human.

Example 9 may include a method of searching humans comprising generating a map of a search environment based on a probability of a target human being present within the search environment, capturing a red, green, blue, depth (RGBD) image of one or more potential target humans in the search environment based on the map; and causing a robot apparatus to obtain a frontal or near-frontal view position with respect to at least one of the one or more potential target humans based on the RGBD images.

Example 10 may include the method of example 9, further comprising classifying potential target human orientation.

Example 11 may include the method of example 9, further comprising emitting an audible communication to a potential target human when there is insufficient room to move the robot apparatus in front of the potential target human, and wherein the audible communication prompts the potential target human to turn towards the robot apparatus to obtain the frontal or near-frontal position.

Example 12 may include the method of example 9, further comprising examining context to determine whether a potential target human is an actual target human.

Example 13 may include the method of example 12, further comprising comparing a context-based recognition of the potential target human to a threshold value.

Example 14 may include the method of example 13, further comprising moving the robot apparatus to another potential target human when the context-based recognition of the potential target human is lower than the threshold value.

Example 15 may include at least one computer readable storage medium comprising a set of instructions, which when executed by a computing device, cause the computing device to generate a map of a search environment based on a probability of a target human being present within the search environment, capture a red, green, blue, depth (RGBD) image of one or more potential target humans in the search environment based on the map, and cause a robot apparatus to obtain a frontal or near-frontal view position with respect to at least one of the one or more potential target humans based on the RGBD images.

Example 16 may include the at least one computer readable storage medium of example 15, wherein the instructions, when executed, cause a computing device to classify potential target human orientation.

Example 17 may include the at least one computer readable storage medium of example 15, wherein the instructions, when executed, cause a computing device to emit an audible communication to a potential target human when there is insufficient room to move the robot apparatus in front of the potential target human, and wherein the audible communication is to prompt the potential target human to turn towards the robot apparatus to obtain the frontal or near-frontal view position.

Example 18 may include the at least one computer readable storage medium of any of examples 15-17, wherein the instructions, when executed, cause a computing device to examine context to determine whether a potential target human is an actual target human.

Example 19 may include the at least one computer readable storage medium of example 18, wherein the instructions, when executed, cause a computing device to compare a context-based recognition of the potential target human to a threshold value.

Example 20 may include the at least one computer readable storage medium of example 19, wherein the instructions, when executed, cause a computing device to move the robot apparatus to another potential target human when the context-based recognition of the potential target human is lower than the threshold value.

Example 21 may include a human search apparatus comprising means for generating a map of a search environment based on a probability of a target human being present within the search environment, means for capturing red, green, blue, depth (RGBD) images of one or more potential target humans in the search environment based on the map, and means for causing a robot apparatus to obtain a frontal or near-frontal view position with respect to at least one of the one or more potential target humans based on the RGBD images.

Example 22 may include the apparatus of example 21, further comprising means for classifying potential target human orientation.

Example 23 may include the apparatus of example 21, further comprising means for emitting an audible communication to be emitted to a potential target human when there is insufficient room to move the robot apparatus in front of the potential target human, and wherein the audible communication is to prompt the potential target human to turn towards the robot apparatus to obtain the frontal or near-frontal view position.

Example 24 may include the apparatus of example 21, further comprising means for examining context to determine whether a potential target human is an actual target human.

Example 25 may include the apparatus of example 24, further comprising means for moving the robot apparatus to another potential target human when the context-based recognition of the potential target human is lower than a threshold value.

Advantageously, embodiments may be used to assist robots in quickly identifying a target human without needing to question many potential target humans. Using these embodiments, efficient helper robots for home and office use may be achieved. Searching for humans may be seen as involving two stages. One stage is based on human body information; this stage eliminates many potential targets because their body information does not match that of the target human. In another stage, three-dimensional facial imaging may be used based on the three-dimensional face pose of frontal and near-frontal views. By using two stage identification, three-dimensional facial imaging may only be needed for very few potential targets, saving processing time and increasing overall robot efficiency.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
a map generator to generate a map of a search environment based on a probability of a target human being present within the search environment;
an image sensor to capture red, green, blue, depth (RGBD) images of one or more potential target humans in the search environment based on the map; and
a controller to:
cause a robot apparatus to obtain a frontal or near-frontal view position with respect to at least one of the one or more potential target humans based on the RGBD images, and
cause an audible communication to be emitted to a first potential target human of the at least one of the one or more potential target humans when there is insufficient room to move the robot apparatus in front of the first potential target human.

2. The apparatus of claim 1, further comprising an image processor to classify potential target human orientation.

3. The apparatus of claim 1, further comprising:
an input communicating with the controller, the input including the image sensor and including a microphone.

4. The apparatus of claim 1, further comprising:
an output communicating with the controller including a speaker.

5. The apparatus of claim 4, further comprising:
an image processor to classify potential target human orientation, and
wherein the controller is configured to cause the audible communication to be emitted from the speaker to the first potential target human when the image processor determines that there is insufficient room to move the robot apparatus in front of the first potential target human, and
further wherein the audible communication prompts the first potential target human to turn towards the robot apparatus to obtain the frontal or near-frontal view position.

6. The apparatus of claim 1, further comprising a context recognition unit to determine whether a second potential target human of the one or more potential target humans is an actual target human.

7. The apparatus of claim 6, further comprising a comparing unit to determine if a context-based recognition of the second potential target human is higher or lower than a threshold value.

8. The apparatus of claim 7, wherein if the context-based recognition of the second potential target human is lower than a threshold value, the robot apparatus moves to image another potential target human.

9. A method comprising:
generating a map of a search environment based on a probability of a target human being present within the search environment;
capturing red, green, blue, depth (RGBD) images of one or more potential target humans in the search environment based on the map;
causing a robot apparatus to obtain a frontal or near-frontal view position with respect to at least one of the one or more potential target humans based on the RGBD images; and
emitting an audible communication to a first potential target human of the at least one of the one or more potential target humans when there is insufficient room to move the robot apparatus in front of the first potential target human.

10. The method of claim 9, further comprising classifying potential target human orientation.

11. The method of claim 9, wherein the audible communication prompts the first potential target human to turn towards the robot apparatus to obtain the frontal or near-frontal view position.

12. The method of claim 9, further comprising examining context to determine whether a second potential target human of the one or more potential target humans is an actual target human.

13. The method of claim 12, further comprising comparing a context-based recognition of the second potential target human to a threshold value.

14. The method of claim 13, further comprising moving the robot apparatus to another potential target human when the context-based recognition of the second potential target human is lower than the threshold value.

15. At least one computer readable storage medium comprising a set of instructions, which when executed by a computing device, cause the computing device to:
generate a map of a search environment based on a probability of a target human being present within the search environment;
capture red, green, blue, depth (RGBD) images of one or more potential target humans in the search environment based on the map;
cause a robot apparatus to obtain a frontal or near-frontal view position with respect to at least one of the one or more potential target humans based on the RGBD images; and
cause an audible communication to be emitted to a first potential target human of the at least one of the one or more potential target humans when there is insufficient room to move the robot apparatus in front of the first potential target human.

16. The at least one computer readable storage medium of claim 15, wherein the instructions, when executed, cause a computing device to classify potential target human orientation.

17. The at least one computer readable storage medium of claim 15, wherein the audible communication is to prompt the first potential target human to turn towards the robot apparatus to obtain the frontal or near-frontal view position.

18. The at least one computer readable storage medium of claim 15, wherein the instructions, when executed, cause a computing device to examine context to determine whether a second potential target human of the one or more potential target humans is an actual target human.

19. The at least one computer readable storage medium of claim 18, wherein the instructions, when executed, cause a computing device to compare a context-based recognition of the second potential target human to a threshold value.

20. The at least one computer readable storage medium of claim 19, wherein the instructions, when executed, cause a computing device to move the robot apparatus to another potential target human when the context-based recognition of the second potential target human is lower than the threshold value.

* * * * *